(12) United States Patent
Cota-Robles

(10) Patent No.: US 9,804,990 B2
(45) Date of Patent: Oct. 31, 2017

(54) SHARING UNCLAIMED USB DEVICES AS PCI DEVICES

(71) Applicant: VMware, Inc., Palo Alto, CA (US)

(72) Inventor: Erik Cota-Robles, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 480 days.

(21) Appl. No.: 14/469,791

(22) Filed: Aug. 27, 2014

(65) Prior Publication Data

US 2016/0062940 A1    Mar. 3, 2016

(51) Int. Cl.
G06F 13/36 (2006.01)
G06F 13/42 (2006.01)
G06F 9/455 (2006.01)
G06F 13/28 (2006.01)

(52) U.S. Cl.
CPC ...... G06F 13/4221 (2013.01); G06F 9/45558 (2013.01); G06F 13/28 (2013.01); *G06F 2009/45579* (2013.01)

(58) Field of Classification Search
USPC ................................ 710/305–317, 104–110
See application file for complete search history.

(56) References Cited

U.S. PATENT DOCUMENTS

| 8,166,211 | B2 | 4/2012 | Cota-Robles et al. | |
| 8,296,472 | B2 | 10/2012 | Cota-Robles et al. | |
| 8,875,266 | B2 * | 10/2014 | Chambers | G06F 21/10 718/1 |
| 2011/0047542 | A1 * | 2/2011 | Dang | G06F 9/468 718/1 |

\* cited by examiner

*Primary Examiner* — Raymond Phan

(57) ABSTRACT

Examples of the disclosure safely share universal service bus (USB) devices with peripheral component interconnect (PCI) passthrough, and share devices in the USB hierarchy. An in-use counter is maintained for the USB bus and/or for USB hubs. The in-use counter is checked and adjusted when a VM or entity claims and/or unclaims a device. For example, when a PCI passthrough of a USB host controller device is requested, the global in-use counter is checked to determine whether to grant the request. When a VM or entity requests to claim a USB hub, the in-use counter is checked to determine whether to grant the request. The in-use counter indicates whether any USB device attached has been claimed and/or whether the USB host controller device has been claimed by a PCI passthrough operation.

20 Claims, 11 Drawing Sheets

SHARING UNCLAIMED USB DEVICES AS PCI DEVICES

BACKGROUND

Some existing systems share devices between entities such as virtual machines (VMs), user mode driver applications, and kernel mode drivers. An operating system (OS) acts as an interface between the computer hardware and the user and, as such, is responsible for managing and coordinating the requests that user applications make to the computer hardware. The operating system divides the software running in the computer into different layers, such as the user space and kernel layers. The hardware layer of a computer may include the hardware of the computer such as buses, universal serial bus (USB) host controller devices, and peripheral devices attached to the computer. USB devices connect to the host computer system through the USB hub, USB host controller device, and USB bus.

Specific software modules are generally used to control devices that attach to the computer system through USB, peripheral component interconnect (PCI), and/or other methods. It is advantageous to have these specific software modules rather than having to program the kernel to control input/output (I/O) of attached devices at least because the kernel would need to be programmed to handle the I/O of every device that may be developed to attach to the computer. These software modules are referred to as device drivers. The device drivers act as translators that convert the more general I/O instructions of the operating system to messages that can be understood by a specific device type with which that device driver is associated. Examples of device drivers are kernel mode USB driver and user mode USB drivers. Kernel mode USB drivers are loaded by the kernel and run with full privileges. Kernel mode USB drivers translate system calls from user mode applications to specific I/O commands. User mode USB drivers run in user space with user privilege and communicate with USB devices through I/O commands to the kernel.

USB passthrough operation for a VM is an application that runs in the user space and acts as a user mode driver. VM passes commands to a hypervisor that in turns passes them to a USB passthrough operation that in turns passes them to a USB host controller. By USB passthrough operation, the USB devices may be given in their entirety to the VM. Similarly, with PCI passthrough operation, a USB host controller device may be passed as a PCI device to a VM. PCI passthrough operation gives control of physical devices to VMs. PCI passthrough operation can be used to assign a PCI device (e.g., network interface card, disk controller, host bus adapter, USB controller, FIREWIRE brand controller, soundcard, etc.) to a VM guest, giving it full and direct access to the PCI device. To avoid conflicts, sharing of USB devices should be done in such a manner that no entity can claim a device that another entity has currently claimed. Some existing systems allow entities to notify the claiming entity and allow it to shut down its session cleanly. Further, with some of the existing systems, all USB hubs and USB host controller devices may be reserved for the hypervisor kernel. However, sharing USB devices in these ways limits access to these devices and places burdens on the computing device.

SUMMARY

One or more examples described herein safely share universal serial bus (USB) host controller devices as peripheral component interconnect (PCI) devices among a plurality of virtual machines (VMs) or entities. A computing device maintains a global in-use counter for each of the USB host controller devices. The global in-use counter represents whether the devices attached to the USB host controller device are claimed by at least one of a plurality of entities and/or whether the USB host controller device has been claimed for a PCI passthrough. The computing device calculates the global in-use counter by interrogating a USB bus. The computing device receives a request for PCI passthrough operation of a USB host controller device from one VM or entity of the plurality of VMs or entities having access to the computing device. The computing device responds to the request by determining whether the USB host controller device is claimed by at least one of the plurality of VMs or entities with access to the computing device. The computing device grants the request the VM or entity based on the determination.

Aspects of the disclosure are operable with any logic, routine, code, or process for safely sharing USB host controller devices as PCI devices among a plurality of VMs or entities.

This summary introduces a selection of concepts that are described in more detail below. This summary is not intended to identify essential features, nor to limit in any way the scope of the claimed subject matter.

DETAILED DESCRIPTION

Figure 1:
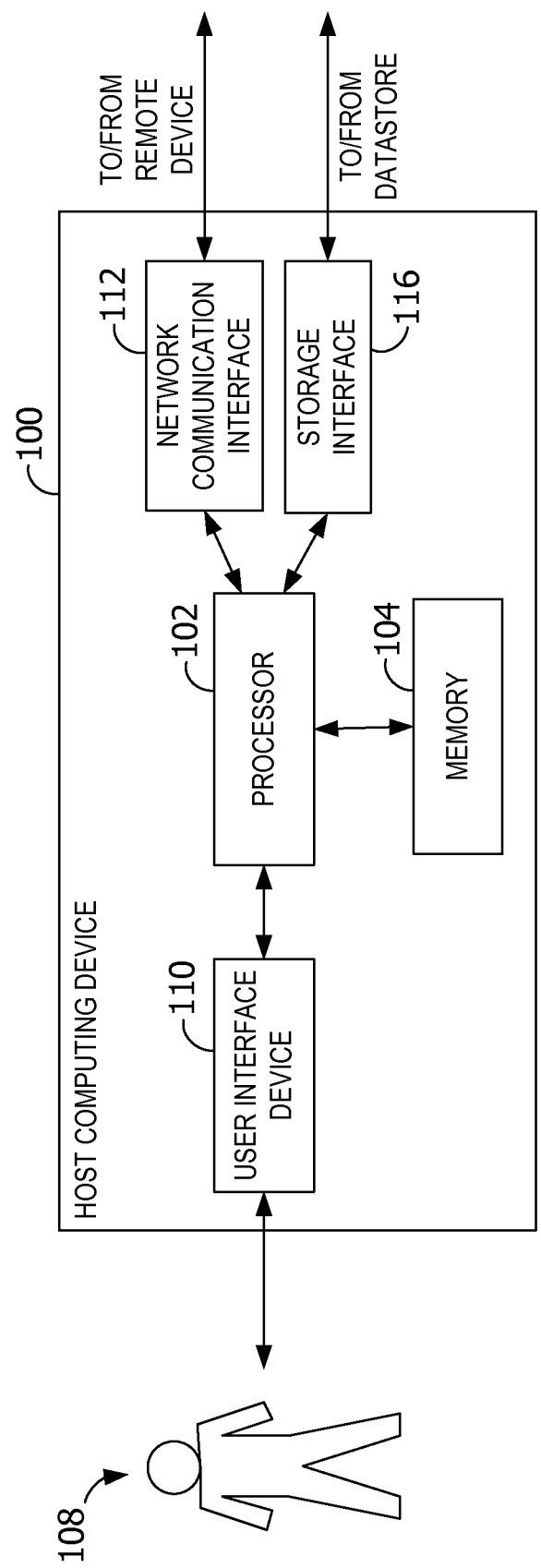
FIG. 1 is a block diagram of an exemplary host computing device.

Examples described herein safely share universal serial bus (USB) host controller devices as peripheral component interconnect (PCI) devices among a plurality of virtual machines (VMs) and/or other entities. Part of a PCI passthrough operation includes performing a check whether a USB host controller device is currently in use. Due to the hierarchical nature of the USB bus, determining whether a USB host controller is "in use" includes checking whether each device attached to it, including hubs, is claimed by an entity. In some examples, a global USB in-use counter is maintained each time when a kernel mode USB driver claims a USB device or releases a USB device, when a user mode USB driver has a file handle open to a device or closes the file handle, and when a PCI passthrough operation occurs or is stopped on the USB host controller device. If the global in-use counter is zero, a request for PCI passthrough to a USB host controller device is granted. Accordingly, this is a low cost PCI passthrough configuration and reduces processor load and increases speed of operation.

In some examples, an in-use counter is maintained for each USB hub. When a USB device is claimed, the in-use counter of each USB hub is maintained by walking the USB bus to determine which hubs are roots of subtrees on which the USB end device sits. In this way, the in-use counter of two parallel sub-trees sums to no more than the in-use counter of their common parent. Accordingly, when a VM or entity requests to claim a device, the host operating system interrogates the USB bus to determine which hubs control access to the device. When a USB end device is claimed, in-use counters of all USB hubs that control access to the USB device are incremented. When a USB end device is unclaimed, in-use counters of all USB hubs that control access to the USB device are decremented. For PCI passthrough operation to a USB host controller device, the in-use counter associated with the root hub corresponding to the USB host controller device may be checked. If the in-use counter is 0, the request for PCI passthrough operation to a USB host controller device is granted.

Aspects of the disclosure present a low cost PCI passthrough configuration that allows for accurate claiming of the USB devices and hubs in a tree structure. If the in-use counter for a hub is zero, it can be claimed by a VM or entity. In such a case, the in-use counter of the claimed USB hub is incremented and that of all other USB hubs that control access to the claimed USB hub. This allows for improved system performance when a VM or entity requests to claim a USB hub or USB host controller device.

Aspects of the disclosure are operable with any module, component, logic, routine, code, and/or process for device sharing with PCI passthrough and hierarchical sharing of devices. An example of such a component includes a daemon that provides a service to USB functionality to be enabled to perform the required checks for device sharing. Another example of such a component may be implemented as a kernel module. An example of such a component is the USB arbitrator by VMware, Inc.

Aspects of the disclosure further improve functioning of the host computing device. Some examples, as described herein, increase the speed of the host computing device by reducing an amount of processing when sharing devices, reduce processor load, ensure consistent operating system resource allocation, reduce errors, and/or provide an improved representation of machine state.

FIG. 1 is a block diagram of an exemplary host computing device 100. Host computing device 100 includes a processor 102 for executing instructions. In some examples, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid-state disks, and/or optical disks. In FIG. 1, memory 104 refers to memory and/or storage. However, in some examples, memory 104 may refer only to memory in host computing device 100, and exclude storage units such as disk drives and hard drives. Other definitions of memory are contemplated.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 110 operates to receive data from user 108, while another device (e.g., a presentation device) operates to present data to user 108. In other examples, user interface device 110 has a single component, such as a touch screen, that functions to both output data to user 108 and receive data from user 108. In such examples, user interface device 110 operates as a presentation device for presenting information to user 108. In such examples, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some examples, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In an example, storage interface 116 couples host computing device 100 to a storage area network (SAN) (e.g., a Fibre Channel network) and/or to a network-attached storage (NAS) system (e.g., via a packet network). Storage interface 116 may be integrated with network communication interface 112.

Figure 2:
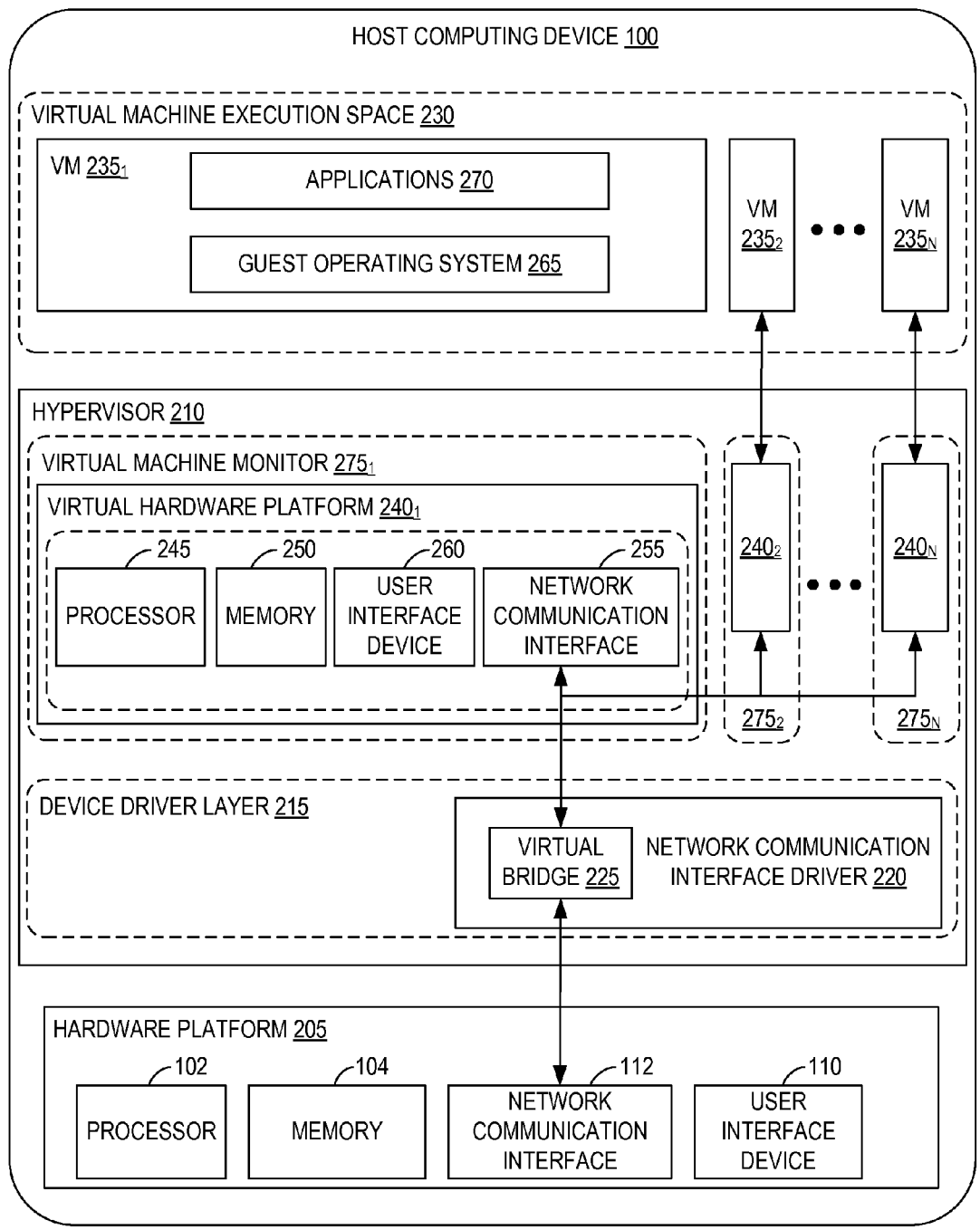
FIG. 2 is a block diagram of virtual machines that are instantiated on a computing device, such as the host computing device shown in FIG. 1.

FIG. 2 depicts a block diagram of virtual machines $235_1$, $235_2 \ldots 235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device. A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some examples, memory 250 in first virtual hardware platform $240_1$ includes a virtual disk that is associated with or "mapped to" one or more virtual disk images stored on a disk (e.g., a hard disk or solid-state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an example, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM 235 in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Aspects of the disclosure are operable with any computer architecture, including non-x86-compatible processor structures such as those from Advanced RISC (reduced instruction set computing) Machines (ARM) and operating systems other than those identified herein as examples.

Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an example of the disclosure is included as a component in VMware's ESX brand software, which is commercially available from VMware, Inc.

Figure 3:
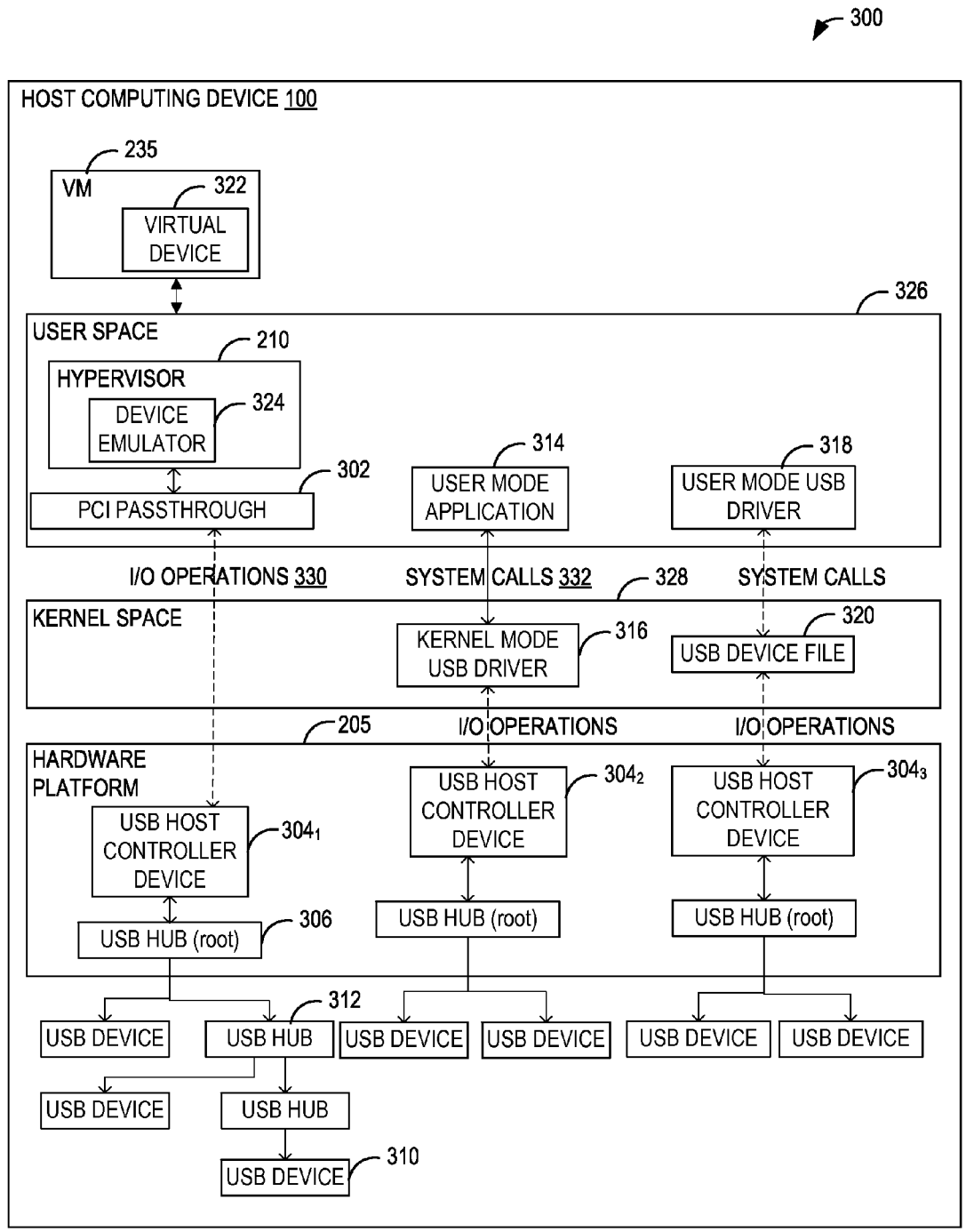
FIG. 3 is a block diagram of an exemplary computing device illustrating PCI passthrough operation, kernel model drivers and user mode drivers for USB devices and USB host controller devices.

FIG. 3 is a block diagram of an exemplary system 300 for safely sharing USB host controller devices 304 as PCI devices among a plurality of VMs 235 or entities. While described with reference to host computing device 100 in FIG. 3, aspects of the disclosure are operable with any computing device or group of computing devices. Host computing device 100 has a plurality of entities, such as a plurality of VMs 235, claiming USB host controller devices 304, USB hubs 312 and/or USB devices 310. The USB host controller devices 304 includes a root USB hub 306 which connects to USB hubs 312 and/or USB devices 310.

Kernel mode USB drivers 316 run in kernel space 328. User mode applications 314 running in user space 326 make system calls 332 to kernel mode USB drivers 316. System calls 332 include standardized requests such as "open", "close", "read" and "write" as well as device-specific input/output (I/O) control (IOCTL) requests. The kernel mode USB drivers 316 translate the system calls 332 to specific input/output (I/O) operations 330 for specific type of devices with which they are associated. For example specific I/O operations may include device-specific IOCTL requests. For example, kernel mode USB driver 316 is associated with USB host controller $304_2$ and/or one of the USB hub 312 and/or USB device 310 attached to it. For example, a user mode application 314 may be a text editor application trying to save a document to USB device 310 that may be a USB flash drive. The text editor might issue a write system call to the kernel mode USB driver 316 associated with USB device 310 that may be a flash drive. The kernel mode USB driver 316 translates the system call 332 to a specific I/O operation to a USB "endpoint" exposed by the USB device 310. FIG. 3 illustrates one kernel mode USB driver for each user mode application 314. However, different user mode applications 314 may use the same kernel mode USB driver 316. For example, both a text editor and a browser may use the same kernel mode USB driver 316 to send output to the same printer. Alternatively or in addition, two USB devices 310 may be claimed by the same kernel mode USB driver 316. For example, both a mouse and a keyboard may be claimed by the same kernel mode USB driver 316.

An example of kernel mode USB driver 316 includes, but is not limited to, the USB human interface driver (HID), which supports human interfaces devices such as keyboards and mice. Another example of the kernel mode USB driver 316 is USB storage device driver that supports devices such as disks, flash drives, floppy drives, cd roms, and other types of storage. There may also be USB host controller drivers in the kernel that control USB host controller devices 304.

Unlike kernel mode USB drivers 316, user mode USB drivers 318 run in user space. User mode USB drivers 318 may control specific type of USB devices 310 attached to the system. User mode USB drivers 318 make system calls to the kernel including but not limited to open, close, read, write and IOCTL calls. For example, user mode device drivers may be implemented through device files. In such examples, there is a dynamic file system in the kernel that presents a view into the device structure of the actual physical hardware of the devices attached to the system. The kernel presents the I/O interface for USB devices as a file, such that reading and writing to the device may be performed using the same format as reading and writing to a file. For example, for USB devices this file system is often referred to as the USB file system or simply "usbfs." For example, USB devices that can be accessed as a stream of bytes, such as printers, cameras, smartphones, are referred to as character devices, with the files corresponding to each of these devices referred to as "chardev" files.

User mode device drivers may read and write to devices by issuing system calls including I/O operations 330 and IOCTL commands to the USB device files 320. Writes to USB device files 320 are translated into the actual output to the USB device 310. For example, in some operating systems including but not limited to Linux, BSD and Mac OS X, one method for writing user mode USB drivers is to write them using Libusb. Libusb is an interface between a user mode USB driver and the kernel. Libusb translates user mode functions into IOCTLs and other system calls that must be made to the kernel in order to implement the functions in the user mode USB driver. User mode USB drivers 318 may claim a device (e.g., gain control of that device) simply by opening the device for write (e.g., opening the device file in order to perform a write to the device).

The process for a kernel mode USB driver 316 to claim a device allows for robust sharing of USB devices 310 between entities, meaning that while one kernel mode USB driver 316 has claimed a USB device 310, no other kernel mode USB driver 316 may interrupt the I/O process of the kernel mode device driver 316 on the USB device 310. In contrast, a user mode USB driver 318 may claim a USB device 310 that another entity is currently using, without even notifying the entity and allowing it to shut down its session cleanly. The other entity may be a kernel mode USB driver 316 or another user mode USB driver 318 or possibly other device driver. As USB devices are arranged hierarchically (e.g., in a tree structure) with devices connected to a hub, if hubs and host controllers are not protected from a user mode USB driver it is possible to bring down all of the USB devices on a hub even if the device itself were to be protected against user mode drivers. User mode USB drivers may not create a problem when they issue read-safe IOCTL operation to the USB device and do not interfere with other drivers, whether kernel mode or user mode, accessing the USB device.

A VM 235 may include virtual devices 322 and a guest operating system (guest OS) which may include corresponding kernel mode USB drivers and/or user mode USB drivers operating in the virtual user space. Components in the VM 235 may be implemented in software using known techniques to emulate the corresponding components of an actual computer. For example, the virtual devices 322 may include USB devices 310 or PCI devices implemented as software emulating the corresponding devices attached to the host computing device 100. Hypervisor 210, in some examples, is software that runs directly on top of a host computing device 100, or directly on the hardware, and virtualizes all the resources of the machine. Hypervisor 210 usually includes device emulators 324, which may constitute the virtual devices 322 that the VM 235 addresses. The interface exported to the VM 235 is then the same as the hardware interface of the host computing device 100 to, for example, the USB devices 310. Hypervisor 210 receives requests from the drivers in the VM 235 or the guest OS and passes these requests through to the USB host controller device 304 using PCI passthrough 302. PCI passthrough 302, in some examples, is an application running in user space of the host machine that acts like a user mode USB driver 318, taking the requests that the hypervisor 210 receives from the VM 235 and passing them through to the USB host controller device 304. By PCI passthrough 302, the USB devices 310 may be given in their entirety to the VMs or the guest OS. For example, PCI passthrough 302 may be implemented using device files such as chardevs or proc nodes.

Figure 4:
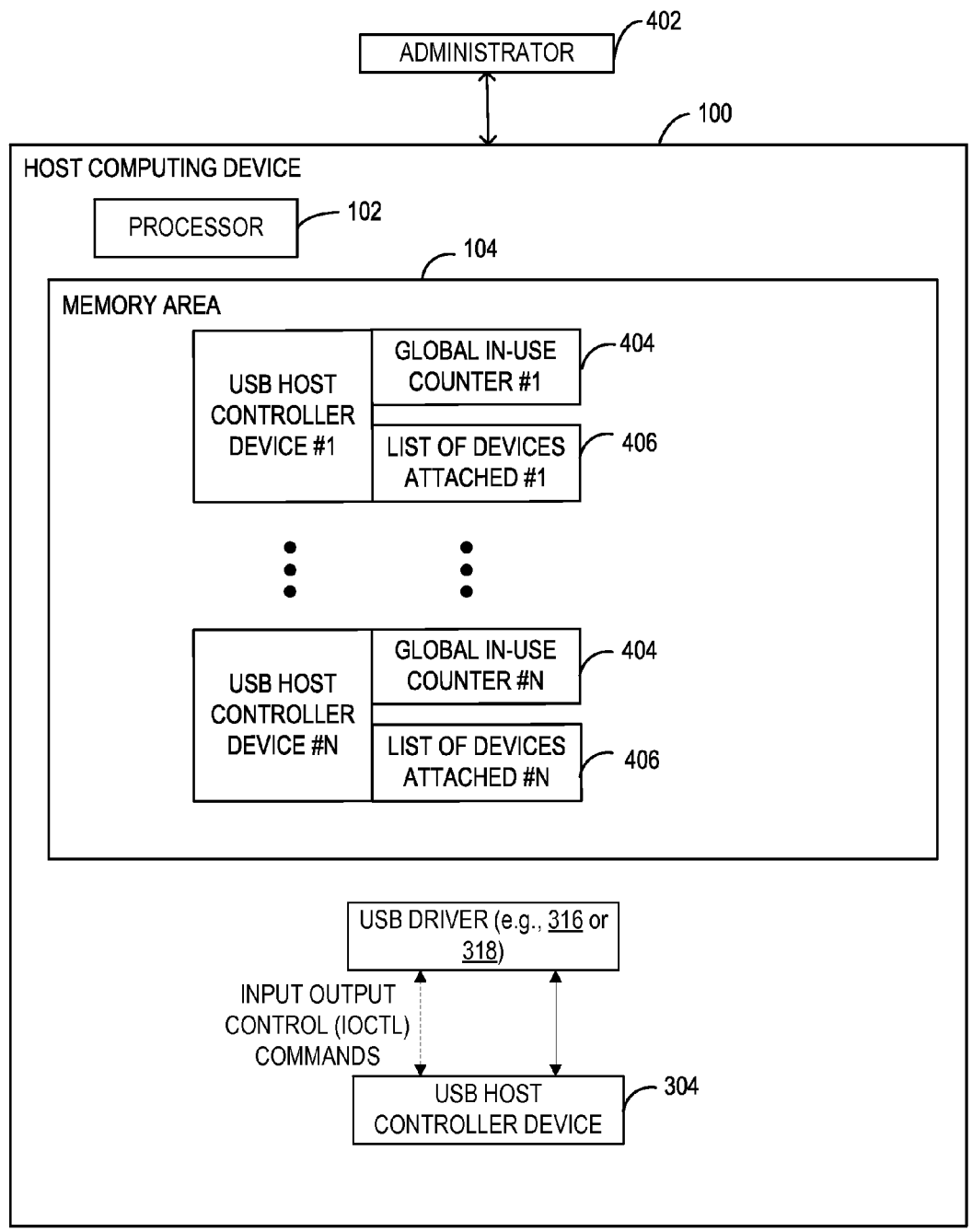
FIG. 4 is a block diagram of an exemplary computing device for storing data for implementing PCI passthrough operation to USB host controller devices.

FIG. 4 is a block diagram 400 of an exemplary host computing device 100 for implementing PCI passthrough operation to USB host controller devices 304. Administrator 402 interacts with host computing device 100. Host computing device 100 represents any device executing instructions (e.g., as application programs, operating system functionality, or both) to implement the operations and functionality described herein. Host computing device 100 may include any computing device or processing unit. For example, host computing device 100 may represent a group of processing units or other computing devices, such as in a cloud computing configuration.

Host computing device 100 has at least one processor 102 and memory area 104. Processor 102 includes any quantity of processing units, and is programmed to execute computer-executable instructions for implementing aspects of the disclosure. The instructions may be performed by processor 102 or by multiple processors executing within host computing device 100, or performed by a processor external to host computing device 100. In some examples, processor 102 is programmed to execute instructions such as those illustrated in the figures to implement allowing or preventing entities to claim USB host controller devices 304. Processor 102 is also programmed to execute instructions such as those illustrated in the figures to interrogate and maintain global in-use counters 404 associated with USB host controller devices.

Memory area 104 includes any quantity of computer-readable media associated with or accessible by host computing device 100. Memory area 104, or portions thereof, may be internal to host computing device 100, external to host computing device 100, or both.

In the example of FIG. 4, memory area 104 stores values corresponding to global in-use counters 404 associated with each of the USB host controller devices 304. The memory area 104 may also store a list of devices 406 attached to a USB host controller device 304. For example, the /proc/bus/usb/devices file contains a list of all USB devices attached at that moment in time (e.g., a current time), and provides other USB-specific information about each device. Files at this location include the device file for specific USB devices and/or USB host controller devices, and include information about them. These device files support a wide range of IOCTL commands that allow user mode applications to send and receive USB data from the device, and thus are useful to user mode USB drivers.

Figure 5:
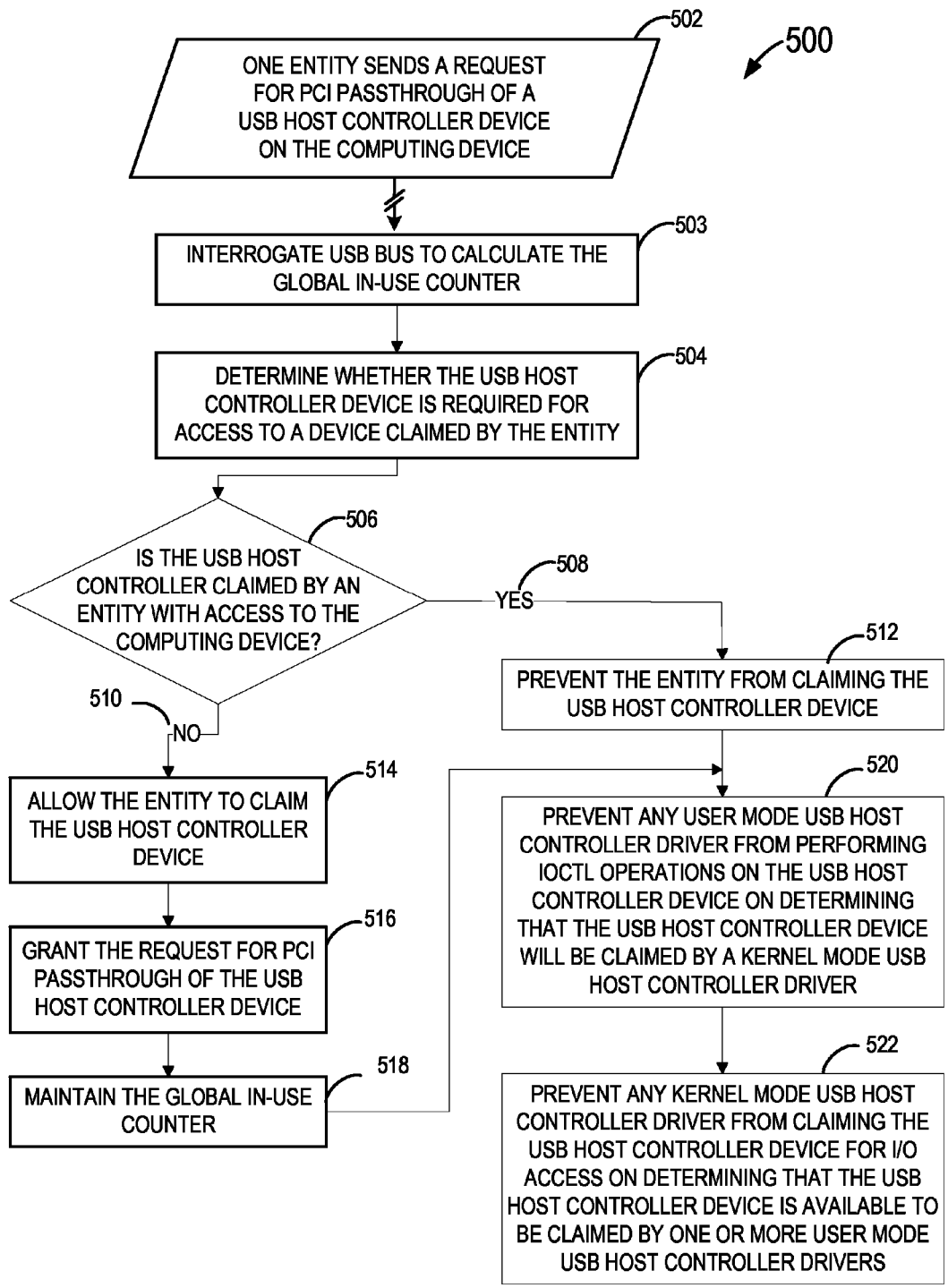
FIG. 5 is a flowchart of an exemplary method performed by the host computing device to determine if the USB host computing device be claimed an entity for PCI passthrough operation.

FIG. 5 is a flowchart of an exemplary method 500 performed by host computing device 100 to safely share USB host controller devices as PCI devices among a plurality of VMs 235 and/or other entities. While method 500 is described with reference to execution by host computing device 100, it is contemplated that method 500 may be performed by any component of any computing device.

At 502, host computing device 100 receives, from one VM 235 with access to the computing device, a request for PCI passthrough 302 of a USB host controller device 304 on the computing device. In some examples, hypervisor 210 receives a request from a VM 235 for PCI passthrough 302 to a USB host controller device 304. With PCI passthrough 302, a USB host controller device 304 can be passed as a PCI device to a VM 235. In some examples, PCI passthrough 302 is implemented as an application running in the user space of the host machine that acts as a user mode USB driver, taking the requests that the hypervisor 210 receives from the VM 235 and passing them through to the host controller.

At 503, host computing device 100 interrogates a USB bus to calculate the global in-use counter. A global in-use counter may be maintained for USB host controller devices 304 and represents its availability for a PCI passthrough operation. USB devices 310 are connected to USB bus through USB hubs 312 and USB host controller devices 304. Communication to and from USB devices 310 pass through exactly one USB host controller device 304 and a non-negative number of USB hub 312 devices. If any USB device 310 is claimed and/or is in use by an entity, the USB host controller device 304 and the USB hub 312 device required for communication to the USB device 310 is available. If either the USB host controller device 304 or the USB hub device required for communication with the USB device 310 is unavailable, that USB device 310 cannot be claimed by an entity. For example, if there is a PCI passthrough operation on a USB host controller device 304, it is unavailable for any other operation. During this time, any USB device 310 under its hierarchy is not available for any other operation and cannot be claimed by any entity. Similarly, if a USB device 310 has been claimed by an entity, a USB host controller device 304 required for communication to the USB device 310 is not available for a PCI passthrough operation.

In some examples, a global in-use counter for a USB host controller device 304 may be maintained and incremented whenever a kernel mode driver claims a USB device 310 under its hierarchy, and/or whenever a user-mode driver has a file handle open to a USB device 310 under its hierarchy. In some examples, the global in-use counter a USB host controller device 304 is decremented when the kernel mode driver releases the USB device 310 under its hierarchy, and/or whenever the user-mode deriver closes the file handle to the USB device 310 under its hierarchy. The global in-use counter 404 for a USB host controller device 304 is set to −1 when a PCI passthrough 302 has occurred on it. For example, the global in use counter 404 for each of the USB host controller devices 304 may be maintained and stored in memory.

TABLE 1

Example Relationship between a Global In-Use Counter and Status of USB Devices.

| Global in-use counter for a USB host controller device | Status of USB host controller device | Status of all USB devices in its hierarchy |
|---|---|---|
| −1 | PCI passthrough has occurred | All USB devices are unavailable to be claimed by any entity |
| 0 | Available for a PCI passthrough operation | All USB devices are available to be claimed by any entity |
| ≥1 | Unavailable for a PCI passthrough operation | USB host controller and/or one or more of the USB devices have been claimed |

As shown in Table 1 above, when global in-use counter 404 for a given USB host controller device 304 is −1, a PCI passthrough 302 has occurred on it and it is unavailable. During PCI passthrough, the USB host controller device 304 and all devices attached to it are passed to the VM 235, or other requesting entity. This also disables "read-safe IOCTL" operations to the USB host controller device and the USB devices 310 attached to it. When global in-use counter 404 for a given USB host controller device 304 is 0, neither it nor any of the devices attached to it have been claimed by the VM 235 or other entity. In such a case, the in-use counter of all the devices attached to it are also 0. When the global in-use counter 404 for a given USB host controller device 304 is ≥1, the USB host controller device 304 itself and/or one or more of the USB devices 320 attached to it have been claimed. For example, kernel mode USB drivers 316 and/or user mode USB drivers 318 may be claiming the USB host controller device 304 and/or one or more of the USB devices 320 attached to it.

Although the global in-use counter is described herein to be maintained for USB host controller device 304 and/or USB hubs 312, the global in-use counter may be maintained for part of the USB tree and/or any component attached to the USB tree.

At 504, host computing device 100 determines whether the USB host controller device 304 is required for access to a device that is being claimed by the entity. USB devices 310 are arranged hierarchically connected to hubs and USB host controller device 304 in a tree structure. In some examples, the device being claimed may be the USB host controller device 304. This may be a passthrough request for any one of the USB host controller devices 304. The device being claimed may also be a USB device 310 or a USB hub 312 connected to the USB host controller device 304. The USB host controller device 304 is required to access to a USB device 310 if the USB device 310 is part of the tree structure connected to the USB host controller device 304 and if the USB device 310 is under the hierarchy of the USB host controller device 304.

At 506, host computing device 100 determines whether the USB host controller device 304 has already been claimed by at least one of the plurality of entities with access to the computing device. If the USB host controller device 304 itself has been claimed by an entity, it is not available to another entity until it is released. For example, if there is a PCI passthrough 302 to the USB host controller device 304 from an entity, the USB host controller device 304 has already been claimed and is not available to another entity until it is released. When a PCI passthrough 302 has occurred on a USB host controller device 304, its global in-use counter is −1 (or other representative value) and the value of global in-use counter may be used to determine that the USB host controller device 304 has been claimed. If any device attached to the USB host controller device 304 is claimed by an entity, the USB host controller device 304 required for communication to the USB device 310 is considered "in-use" and not available for a PCI passthrough operation. In such cases when one or more devices attached to a USB host controller device 304 is claimed, its global in-use counter is positive and the value of global in-use counter may be used to determine whether the USB host controller device 304 is available for a PCI passthrough operation.

At 508, host computing device 100 determines that the USB host controller device 304 has already been claimed by at least one of the plurality of entities with access to the computing device. For example, at 508, the USB host controller device 304 is in use and there may already have been a PCI passthrough operation, or one of the USB devices 310 attached to it may be claimed. At 508, the global in-use counter associated with the USB host controller device 304 is −1 or positive. In this example, the USB host controller device 304 is unavailable for a new PCI passthrough operation.

At 512, host computing device 100 prevents the entity from claiming the USB host controller device 304. If the USB host controller or a USB device 310 attached to it has been claimed or is required for another operation, PCI passthrough 302 to the USB host controller device 304 cannot be allowed. For example, if USB is boot media required by host operating system, PCI passthrough 302 of USB host controller device 304 has to be prevented. In this example, PCI passthrough 302 of a USB host controller device 304 is prevented to maintain continuous access to the boot media that are commonly used for installation, scratch and coredump partitions.

At 510, host computing device 100 determines that the USB host controller device 304 has not been claimed by at least one of the plurality of entities with access to the computing device. For example, at 510 USB host controller device 304 did not have a PCI passthrough operation and none of the USB devices 310 attached to it is claimed. At 510, the global in-use counter associated with the USB host controller device 304 is 0. The USB host controller device 304 is available for a new PCI passthrough operation.

At 514, host computing device 100 allows the entity to claim the USB host controller device 304 on determining that the USB host controller device 304 is not claimed by any entity or VM. Once the entity is allowed to claim the USB host controller device 304, it is reserved for the entity until a PCI passthrough operation can be initiated.

At 516, host computing device 100 grants the request for a PCI passthrough 302 of the USB host controller device 304 on determining that it is not claimed by any entity with access to the computing device. For example, a USB host controller device 304 may be a PCI device that is a root endpoint of the USB tree structure. PCI passthrough 302 passes the USB host controller device 304 as PCI device to an entity or VM. PCI passthrough 302 to a USB host controller device 304 enables improved speed and efficiency of communication between it and requesting entities.

At 518, host computing device 100 maintains the global in-use counter. When a USB host controller device 304 is available for a PCI passthrough 302 operation and before the operation is initiated, the global in-use counter is 0. After the entity claims the USB host controller device 304 for a PCI passthrough operation, the global in-use counter is set to −1.

At 520, host computing device 100 prevents a user mode USB host controller driver from performing IOCTL operations on the USB host controller device 304 on determining that the USB host controller device 304 is claimed by a kernel mode USB host controller driver. A request to open a device may be received from a user mode USB host controller driver. For example, a field in a core library data structure for the device may be checked indicating whether the device is available for user mode USB drivers. If the USB host controller device 304 is claimed by a kernel mode USB host controller driver, IOCTL operations on it from a user mode USB host controller driver will likely fail and will be prevented from being initiated. Also, a user mode USB host controller driver is prevented from performing IOCTL operations on the USB host controller device 304 on determining that USB host controller device 304 is claimed or will be claimed for a PCI passthrough operation. For example, through a PCI passthrough operation, the USB host controller device 304 may be entirely given to the VM or entity claiming. In such a case, the USB host controller device 304 may be available to the VM or entity claiming it, and a user mode USB host controller driver is prevented from performing an IOCTL operation.

At 520, host computing device 100 prevents any kernel mode USB host controller driver from claiming the USB host controller device 304 for I/O access on determining that the USB host controller device 304 is available to be claimed by one or more user mode USB host controller drivers. A kernel mode USB host controller driver is prevented from claiming the USB host controller device 304 for I/O access on determining that USB host controller device 304 is claimed or will be claimed for a PCI passthrough operation. As in 518 when a VM or entity claims a USB host controller device 304 for a PCI passthrough operation, a kernel mode USB host controller driver is prevented from claiming the USB host controller driver for an I/O operation.

Figure 6:
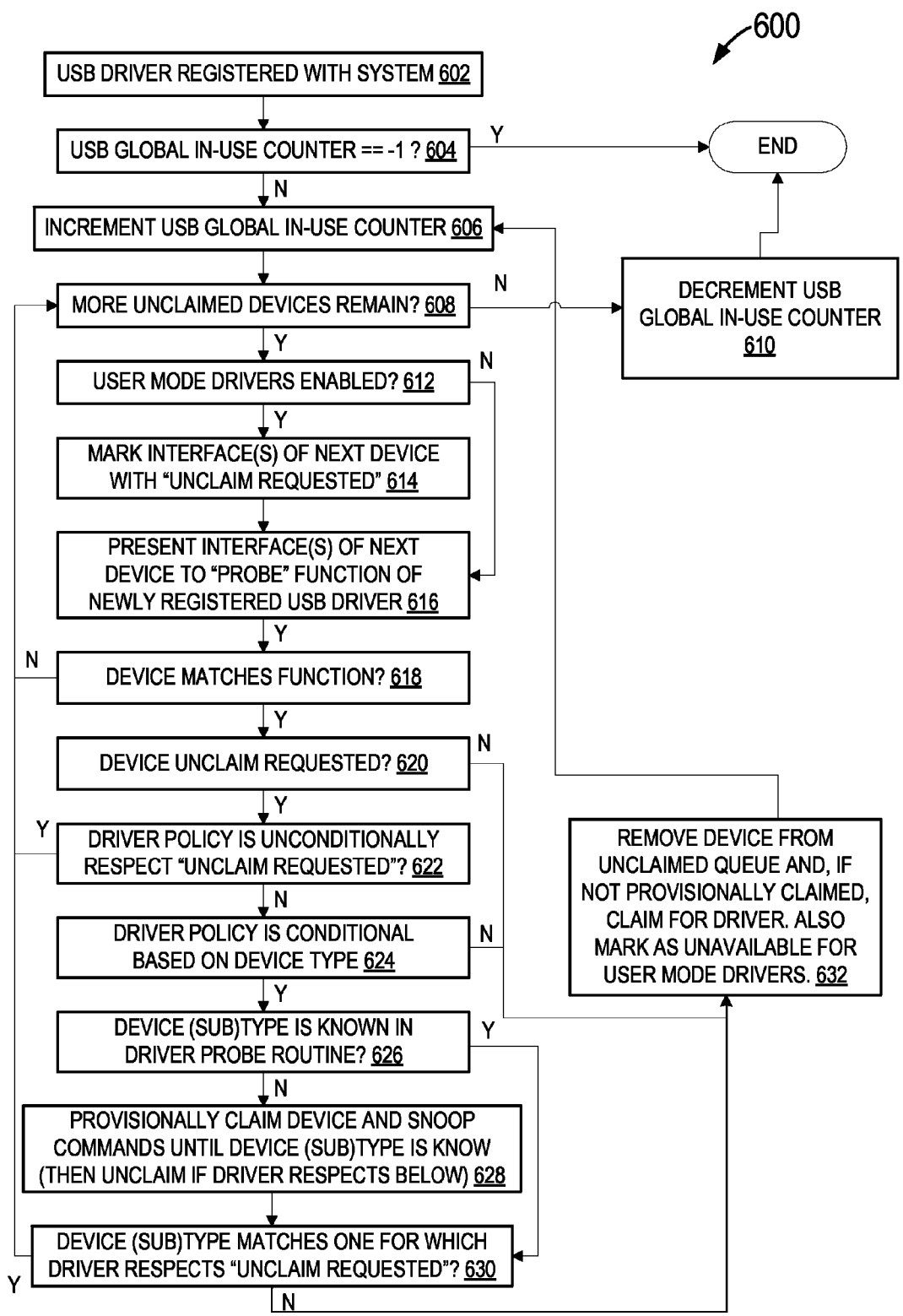
FIG. 6 is a flowchart of an exemplary method performed by the host computing device to implement a device claiming logic when a new USB driver is registered.

FIG. 6 is a flowchart of an exemplary method 600 performed by the host computing device 100 to implement the device claiming logic when a new USB driver is registered. While method 600 is described with reference to execution by host computing device 100, it is contemplated that method 600 may be performed by any component of any computing device.

At 602, a new USB driver has registered with the host computing device 100. The new USB driver may be a kernel mode USB driver 316 or a user mode USB driver 318. The information of the registered USB driver may be stored in any data structure representing a list of registered USB drivers and may be checked against attached USB devices 310 for a match.

At 604, the host computing device 100 checks whether the global in-use count is equal to −1. When the USB global in-use counter is −1, a PCI passthrough 302 has occurred and the USB host controller has been claimed. In such a case, the USB host controller device and any USB devices attached to it are unavailable. If the global in-use count is equal to −1, the method ends. The driver in not checked for a match with any other devices.

If a USB global in-use counter is not −1, at 606 the USB global in-use counter is incremented. Incrementing the global in-use counter here assumes that the newly registered USB driver will claim one of the USB devices. If the USB driver does not end up claiming one of the USB devices, the global in-use counter is decremented at 610. At the start 606, the global in-use counter is either 0 or positive. At the end of 606, the global in-use counter is positive.

At 608, the host computing device 100 checks if there are more unclaimed devices remaining to be presented to the USB driver. Each of the unclaimed devices is checked If all the devices are checked and no more unclaimed devices remain, at 610 the host computing device 100 decrements the USB global in-use counter. When at 606 the global in-use counter was incremented, the incrementing represents the registered USB driver claiming a device. The decrementing of global in-use counter at 610 corresponds to the global in-use counter previously being incremented at 606 as there were no more unclaimed devices remaining at 608.

If there are still more unclaimed devices remaining, at 612 the host computing device 100 checks if system is in the state of "user mode USB drivers enabled." In some examples, there is a global setting in the operating system for the state of either "user mode USB drivers enabled" or "user mode USB drivers not enabled." At 612, this setting is checked.

If the state is "user mode drivers enabled", at 614 the host computing device 100 marks one or more interfaces of the next device with "unclaim requested." Marking a device with "unclaim requested" may be performed in a variety of ways. In some examples, marking the device with "unclaim requested" may comprise marking an added field in the memory that the USB core library populates for the device. If the system is in the state of "user mode drivers not enabled", the method advances to 616.

At 616, the host computing device 100 presents the interface of the next device to probe the function of the newly registered USB driver. At 618, the probe function of the newly registered USB driver is called to determine if the device matches the newly registered USB driver. In some examples, USB devices are classified as functions that provide capability to the host computing device 100. USB device may have one or more functions. For example, a webcam may have a video device function and a microphone (e.g., an audio device function). The USB driver probe function checks the information of the USB device and decides if the USB driver is appropriate for the USB device. If the USB device matches the USB driver, the USB driver may be appropriate for the USB device. If the USB device does not match the USB driver, the USB driver is not appropriate for the USB device.

If the USB device does not match the USB driver, the method advances to operation 608 to check more unclaimed devices. If the USB device matches the USB driver, at 620 the host computing device 100 checks whether the USB device is marked with "unclaim requested." For example, the USB device may have been marked with "unclaim requested" at 614 if user mode drivers are enabled. In some examples, operation 620 may be performed using the USB driver's probe function that has been extended to include code for performing such a check. If the device is not marked with driver "unclaim requested," the method advances to operation 632 and marks the USB device unavailable for user mode drivers.

If it is determined that the USB device is marked "unclaim requested," at operation 622 the host computing device 100 checks if the USB driver has a policy of unconditionally respecting driver "unclaim requests." In some examples, operation 622 may be performed using an extended version of the kernel mode USB driver's probe routine. If at 622 it is determined that the USB driver unconditionally respects driver "unclaim requests", the USB device will not be claimed by the newly registered USB driver. The method advances to operation 608 to check more unclaimed devices.

If at 622 it is determined that the USB driver does not have a policy for unconditionally respecting driver "unclaim requests", at 624 it is determined if the newly registered USB driver has a policy to conditionally respect such requests based on the type or subtype of the USB device that has been presented. Again, in some examples, this operation may be performed using an extended version of the driver's probe routine. If the USB driver does not have such a policy, the method advances to operation 632.

If the USB driver does have such a policy, at operation 626 it is determined if the device type and/or subtype is known. Operation 626 may also be performed using an extended version of the USB driver's probe function. If at 626, the device type (e.g., a type and/or a subtype) is not known, the method continues at 628, in which the USB device is provisionally claimed by the USB driver and the device type is snooped by examining all data returned by the device in a device type specific manner. For example, in the case of USB storage devices (disks, flash drives, cd roms, etc.), the USB storage driver may be extended to examine all data returned by the device in response to SCSI inquiry commands in order to distinguish between, for example, disks and cd roms. Once the device type has been determined at 628, the method continues at 630. If the device type is known at 626, the method continues at 630.

At 630, it is determine if the device's type matches the type of device for which the USB driver respects unclaim requests. This determination may be made using an extended version of the probe routine of the USB driver. If the device type does match a type for which the USB driver respects unclaim requests, the USB driver unclaims the provisionally claimed device and the method advances to operation 608 to check for more unclaimed devices. If the device type does not match a type for which the USB driver respects "unclaim requests", the method executes operation 632.

At 632, the USB device is removed from an unclaimed queue. Unclaimed queue is a set of USB devices that are presented to any newly registered USB driver. Operation 608 checks this unclaimed queue to check for unclaimed devices. At 632, if the USB device is not provisionally claimed, the newly registered USB driver claims the USB device. At 632, the USB device is further marked to be unavailable for user mode USB drivers 318. If a USB device is marked unavailable for user mode USB drivers, any user mode USB driver is prevented performing any operations other than read-safe IOCTL operations on the USB device. The method advances to 606 to increment the global in-use counter 404 before advancing to 608 to check if USB driver matches any other unclaimed USB devices. The global in-use counter 404 is incremented at 606 once for the USB driver that registered with the system at 602 and once for each device claimed by the driver at 632 and then decremented (for the driver) at 610. The net result is that the global in-use counter 404 is incremented by the number of devices claimed by the driver while also functioning as a mutex or semaphore that stops other entities from claiming the USB host controller device 304 for PCI passthrough 302 while the driver is processing the list of unclaimed devices.

Figure 7:
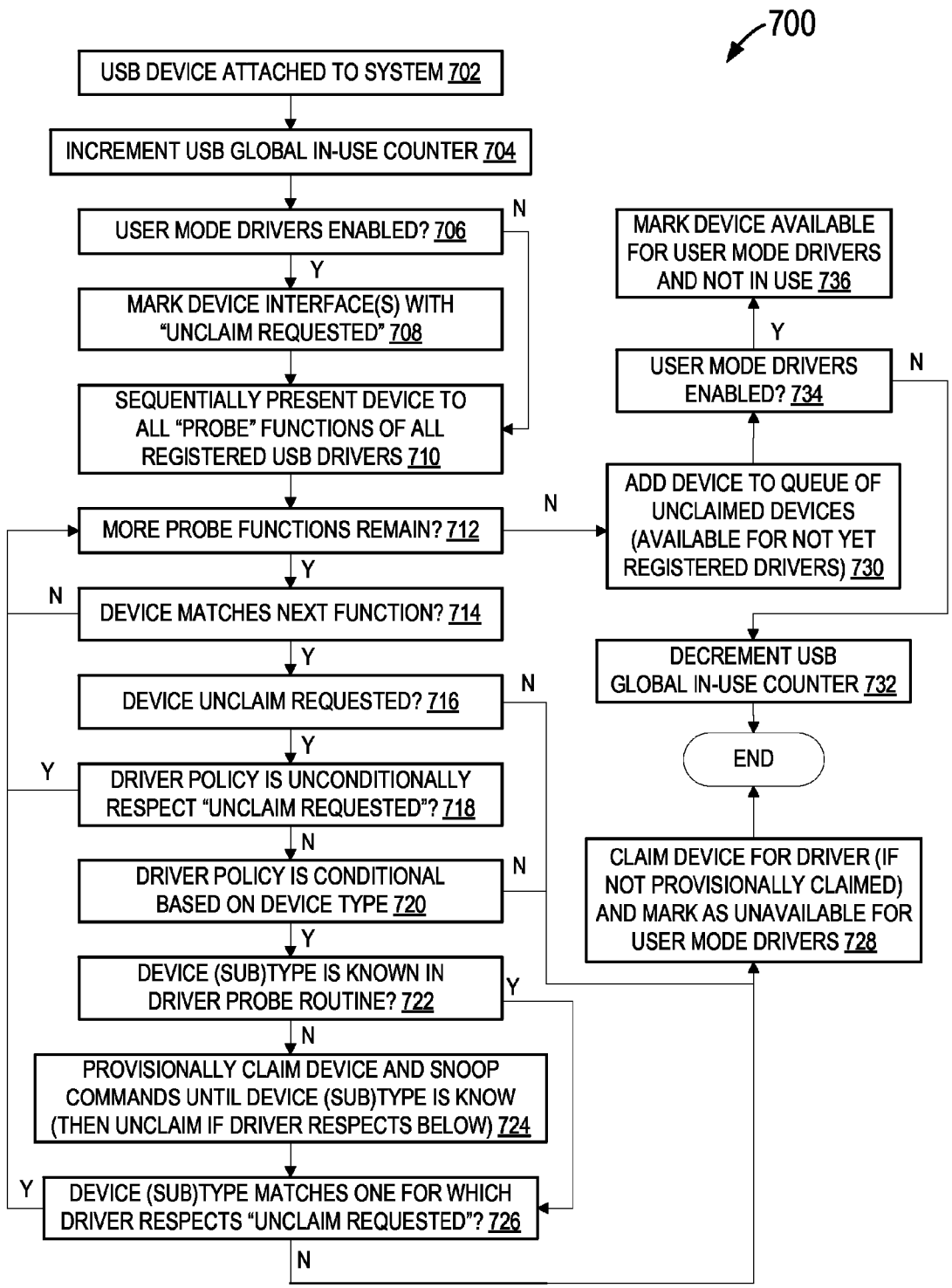
FIG. 7 is a flowchart of an exemplary method performed by the host computing device to implement a device claiming logic when a new USB device is attached to the system.

FIG. 7 is a flowchart of an exemplary method 700 performed by the host computing device 100 to implement the device claiming logic when a new USB device is attached to the system. While method 700 is described with reference to execution by host computing device 100, it is contemplated that method 700 may be performed by any component of any computing device.

At 702, notification is received by the kernel that a USB device has been newly attached to the system. If PCI passthrough 302 of USB host controller device is configured, any newly attached USB devices under the USB host controller device hierarchy are not be presented to the OS. When PCI passthrough 302 to a USB host controller device stops, all USB devices under USB host controller device are presented to the OS as if newly attached.

At 704, the USB global in-use counter is incremented. Incrementing the global in-use counter assumes that the newly attached USB device will be claimed by one of the USB drivers. If USB device is not claimed by one of the registered USB drivers, the global in-use counter is decremented at 732. This operation corresponds to operation 606 in method 600.

At 706, it is determined whether the system is in the state of "user mode USB drivers enabled." In some examples there is a global setting in the operating system for the state of either "user mode drivers enable" or "user mode drivers not enable." At 706, this setting is checked.

If the state is "user mode drivers enabled", at 708 the host computing device 100 marks one or more interfaces of the newly attached device with "unclaim requested." Marking a device with "unclaim requested" may be performed in a variety of ways that are well known in the field of computer science. This operation corresponds to operation 615 in method 600. If the system is in the state of "user mode drivers not enabled", the method advances to 710.

At 710, the host computing device 100 sequentially presents newly attached USB device to all probe functions of all registered USB drivers. In some examples, all the registered USB drivers may be stored in a data structure representing a list of registered USB drivers. The newly attached USB device presented to all probe functions to each USB drivers in this list sequentially.

At 712, it is checked if more probe functions of registered USB drivers remain to be presented with the USB device. If there are more probe functions of registered USB drivers remaining, at 714 the USB device is checked for a match with a probe function of registered USB drivers. This operation corresponds to operation 618 of method 600. The probe function of the USB driver is checked with the information of the USB device to decide if the USB driver matches with the USB device.

If the USB device does not match the next probe function of the USB drivers, the method advances to operation 712 to check remaining probe functions of the USB drivers. If the USB device matches the next probe function of the USB drivers, at 716 the host computing device 100 checks whether the USB device is marked with a driver "unclaim requested." Operation 716 is similar to operation 620 of method 600. For example, the USB device may have been marked with "unclaim requested" at 708 if user mode drivers are enabled. In some examples, operation 716 may be performed using the USB driver's probe function that has been extended to include code for performing such a check. If the device is not marked with driver "unclaim requested," the method advances to operation 728 and marks the USB device unavailable for user mode drivers.

If it is determined that the USB device is marked "unclaim requested," at operation 718 the host computing device 100 checks if the USB driver has a policy of unconditionally respecting driver "unclaim requests." Operation 718 is similar to operation 622 of method 600. In some examples, operation 718 may be performed using an extended version of the kernel mode USB driver's probe routine. If at 718 it is determined that the USB driver unconditionally respects driver "unclaim requests", the USB device will not be claimed by the newly registered USB driver. The method advances to operation 712 to check remaining probe function of the USB drivers to match with the newly attached USB device.

If at 718 it is determined that the USB driver does not have a policy for unconditionally respecting driver "unclaim requests", at 720 it is determined if the USB driver has a policy to conditionally respect such requests based on the type or subtype of the newly attached USB device that has been presented. Again, in some examples, this operation may be performed using an extended version of the driver's probe routine. Operation 720 is similar to operation 624 of method 600. If the USB driver does not have such a policy, the method advances to operation 728.

If the USB driver does have such a policy, at operation 722 it is determined if the USB device type or subtype is known. Operation 722 may also be performed using an extended version of the USB driver's probe function. If at 722, the device type (e.g., type and/or subtype) is not known, the method continues at 724, in which the USB device is provisionally claimed by the USB driver and the device type is snooped by examining all data returned by the device in a device type specific manner. Once the device type has been determined at 724, the method continues at 726. If the device type is known at 722, the method continues at 726.

At 726, it is determine if the device's type matches the type of device for which the USB driver respects unclaim requests. This determination may be made using an extended version of the USB driver' probe routine. If the device type does match a type for which the USB driver respects unclaim requests, the USB driver unclaims the provisionally claimed device and the method advances to 712 to check for more probe functions of USB drivers. If the device type does not match a type for which the USB driver respects "unclaim requests", the method continues to operation 728.

At 728, if the USB device is not provisionally claimed, the newly attached USB device is claimed for the USB driver. At 728, the USB device is marked to be unavailable for user mode USB drivers 318. If a USB device is marked unavailable for user mode USB drivers, any user mode USB driver is prevented performing any operations other than read-safe IOCTL operations on the USB device. After executing operation 728, the method 700 ends.

If at 712 there no more probe functions of USB drivers remaining to be presented with the USB device, the method advances to operation 730. At 730, all probe functions of all currently registered USB drivers have been presented with the newly attached USB device but none of the USB drivers claimed the USB device. This newly attached USB device is added to the queue of unclaimed devices. The queue of unclaimed devices is a set of USB devices that are presented to every newly registered USB driver.

At 734, the host computing device 100 checks if system is in the state of "user mode USB drivers enabled." In some examples, there is a global setting in the operating system for the state of either "user mode USB drivers enable" or "user mode USB drivers not enable." At 734, this setting is checked.

If the state is "user mode drivers enabled", at 736 the host computing device 100 marks the newly attached device available for user mode drivers and not in use. If the system is in the state of "user mode drivers not enabled" the method advances to 732.

At 732, the host computing device 100 decrements the USB global in-use counter, whereas at 704 the global in-use counter was incremented to indicate that the newly attached USB device will be claimed by one of the registered USB drivers. However, as none of the registered USB drivers has claimed the newly attached USB device, the global in-use counter is decremented to represent that.

Figure 8A:
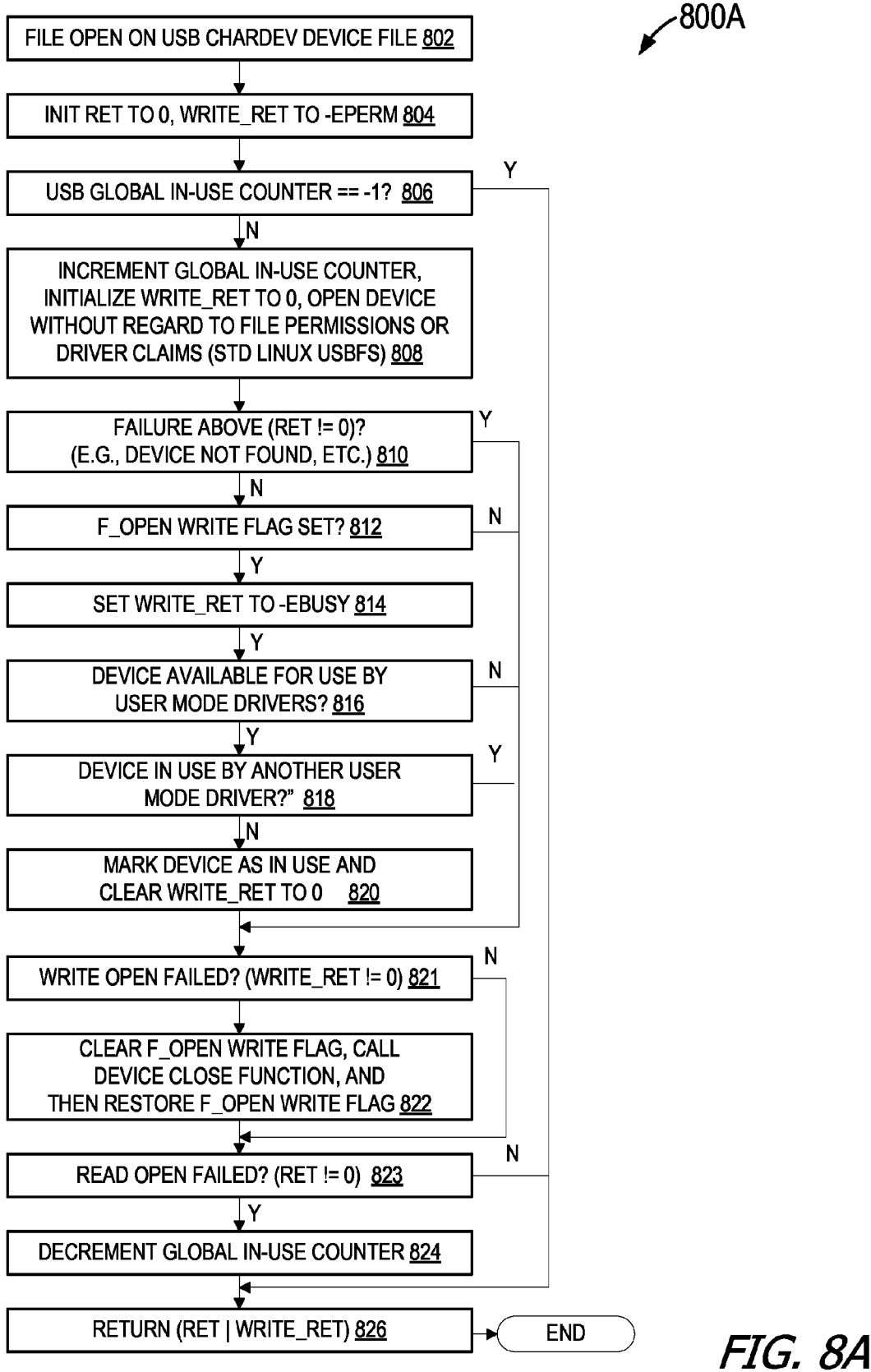
FIG. 8A is a flowchart of an exemplary method performed by the host computing device to prevent a user mode USB driver from opening a device for write if the device is claimed by another USB driver.

FIG. 8A is a flowchart of an exemplary method performed by the host computing device 100 to prevent a user mode USB driver from opening a device for write if the device is claimed by another USB driver. While method 800A is described with reference to execution by host computing device 100, it is contemplated that method 800A may be performed by any component of any computing device. In some examples, kernel space 328 includes a dynamic file system that presents a view into the device structure of the actual physical hardware of the devices attached to the system. The kernel presents the I/O interface for each device as a file such that reading and writing to the device may be performed using the same format as reading and writing to a file. For USB devices, this file system is often referred to as the USB file system or simply "usbfs."

At 802, the host computing device 100 executes a "file open" operation on USB "chardev" device file. For example, this may be a request to open a device received from a user mode USB driver.

At 804, the return value for opening ("ret") the device is set to 0 and the return value for opening the device for write ("write_ret") is set to a value indicating failure such as −EPERM. For example, EPERM is the error code used in some operating systems to indicate that a process, such as the user mode USB driver, does not have the correct permission to execute the IOCTL. The return value is the value that a routine, such as one for opening a file or opening the file for write, returns (e.g., to the USB driver) when it finishes executing. Routines that perform operations on files, such as opening the file, often have return values that indicate whether the routine was successfully executed or whether it failed. For example, in some operating systems, a return value equal to or greater than 0 indicates that the routine executed successfully and a return value of less than 0 indicates the routine failed.

At 806, the host computing device 100 checks whether the global in-use count is equal to −1. When the USB global in-use counter is −1, a PCI passthrough 302 has occurred and the USB host controller has been claimed. In such a case, the USB host controller device and any USB devices attached to it are unavailable. If the global in-use count is equal to −1, the method advances to 826. Here the return value for the open ("ret") is 0 and the return value for open to write ("write_ret") is −EPERM.

If the USB global in-use counter is not −1, at 808 the USB global in-use counter is incremented. Incrementing the global in-use counter assumes that the USB device corresponding to the USB "chardev" device file will be claimed. If the USB device is not claimed, global in-use counter is decremented at 824. At 808, the "write_ret" corresponding to this the device is set to 0. The write_ret has changed from −EPERM to 0. For example, in some operating systems a return value equal to or greater than 0 indicates that the routine executed successfully and a return value of less than 0 indicates the routine failed. At 808, the device is opened. For example, as explained in the background section in some operating systems including, but not limited to, UNIX, LINUX, and ESX (from VMware, Inc.), the device file for the device may be opened. The device open at 808 is performed without regard for file permissions or driver claims.

At 810, it is determined whether the open request failed (e.g., whether the return value is less than 0 such as ret !=0). For example, if the device is no longer attached to the computer, the device file cannot be found and the open file routine returns a value less than 0. If the device open fails at 810, the method advances to operation 821, which is discussed below.

If the device open does not fail, at 812 it is determined whether the f_open write flag is set. The f_open write flag indicates whether the method requesting the device be opened, such as the user mode USB driver, has permission to write to the device file. If the f_open write flag is not set, the device continues at 821.

If the f_open write flag is set, at 814 the write_ret is set to a value indicating a failure. For example, the write_ret may be set to −EBUSY, the value used in some operating systems for indicating that a file open failed because the device was in use by another driver.

At 816, it is determined whether the device is available for user mode USB drivers. For example, a field in the core library data structure for the device indicating whether the device is available for user mode USB drivers may be checked. If the device is not available for user mode USB drivers, the method advances to operation 821.

If the device is available for user mode USB drivers, it is determined at operation 818 whether the device is in use by another user mode USB driver. If the device is in use by another driver, the method advances to operation 821.

If the device is not in use by another driver, at 820 the device is marked as "in use" and the write_ret is set to 0 to indicate that the device has been successfully opened for write.

At 821, it is determined whether the write open failed (e.g., the write_ret value is checked). For example, if the write_ret is set to −EBUSY at 814 and the device either is not available for user mode USB drivers at 816 or is in use by another user mode USB driver at 818, the method advances to operation 820 and the write_ret will continue to be −EBUSY indicating a failure.

If the write open failed, at 822 the f_open write flag is cleared, and the close routine is called. At 822, the f_open write flag is restored, and the method continue at 823. If at 821 it is determined that the open for write did not fail, the method continues at 823.

At 823, it is determined whether the read open request failed (e.g., whether the return value is less than 0, such as ret !=0). For example, if the device were no longer attached to the computer, the device file would not be found and the open file routine would return a value less than 0. If the read open request did not fail, the method advances to operation 826.

If the read open request fails (e.g., ret !=0), at 824 the global in-use counter is decremented. When the global in-use counter was incremented at 806, it expected that that read open request of the device file will not fail. If the read open request fails, the global in-use counter is hence decremented. For example, decrementing global in-use counter corresponds to the device corresponding to the device file not being claimed by the driver.

At 826, the return value for the open ("ret") and the open for write ("write_ret") are returned and the method ends.

Figure 8B:
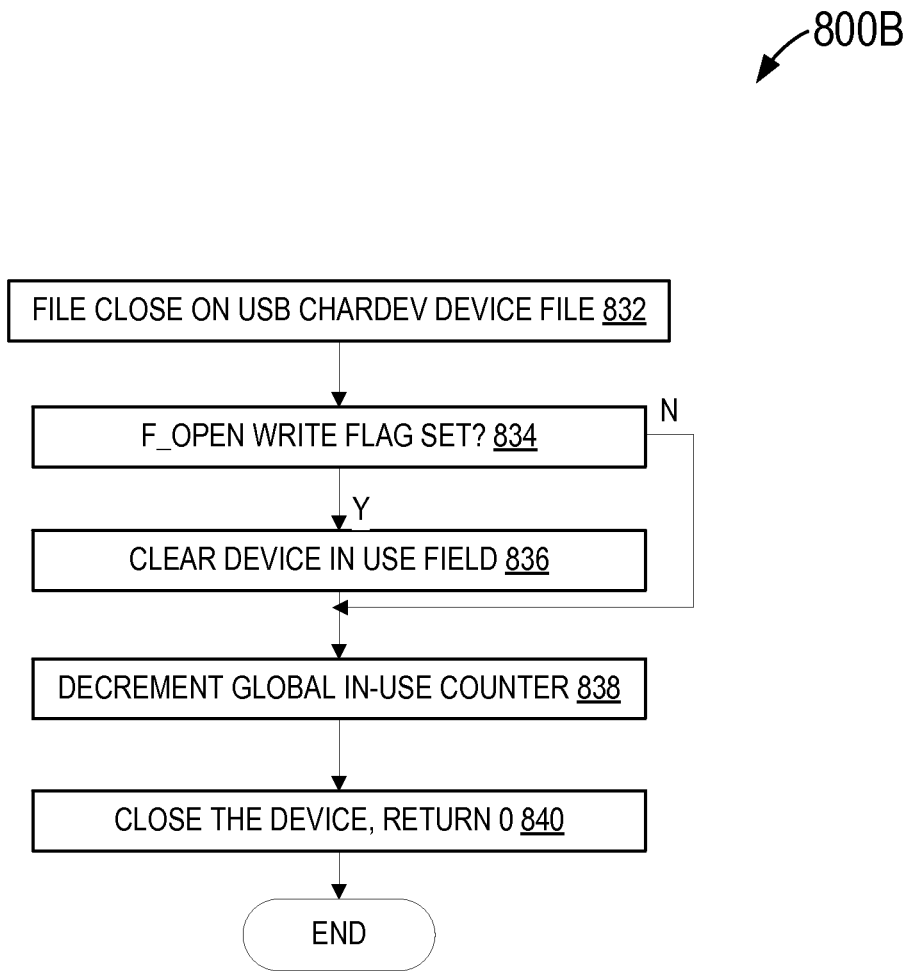
FIG. 8B is a flowchart of an exemplary method performed by the host computing device for closing a file opened by a user mode USB driver.

FIG. 8B is a flowchart of an exemplary method performed by the host computing device 100 for closing a file opened by a user mode USB driver. While method 800B is described with reference to execution by host computing device 100, it is contemplated that method 800B may be performed by any component of any computing device.

At operation 832, a file close request is received for a USB chardev device file. At operation 834, it is determined if the f_open write flag is set.

If the f_open write flag is not set, the device in use field is not cleared and the method advances to 838. The f_open write flag is cleared if the open for write fails (e.g., if the device is in use by another driver). Therefore, the method 800B prevents one user mode USB driver from clearing the "in use" field for a device that is in use by another user mode USB driver.

If the f_open write flag is set, at 836 the device in use field is cleared. For example the f_open write flag is set (e.g., not cleared) when a USB Chardev device file previously opened for write is closed on separate system call.

At 838, the global in-use counter is decremented. As in operation 832 as a file, close request was received for a USB Chardev device file. For example, this corresponded to a USB driver releasing a USB device that it had previously claimed. Decrementing the global in-use counter at 838 correspond to the USB device being released.

At 840, the device is closed, 0 or some other value indicating success is returned and the method ends.

Figure 9A:
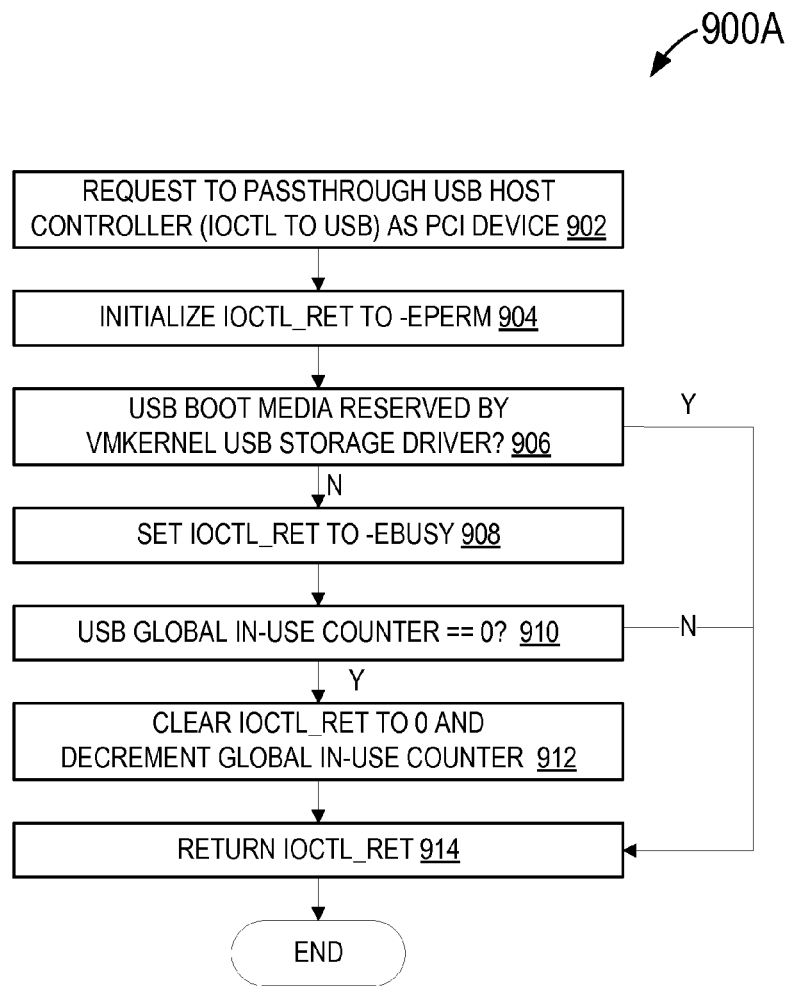
FIG. 9A is a flowchart of an exemplary method performed by the host computing device initiating a passthrough to a USB host controller device as a PCI device

FIG. 9A is a flowchart of an exemplary method performed by the host computing device 100 initiating a passthrough to a USB host controller device as a PCI device. While method 900A is described with reference to execution by host computing device 100, it is contemplated that method 900A may be performed by any component of any computing device.

At 902, a passthrough request is initiated to a USB host controller as a PCI device. In some examples, PCI passthrough 302 is an application running in user space of the host machine. Through PCI passthrough 302, the USB host controller device and all devices attached to it may be given in their entirety to the VMs or the guest OS.

At 904, the IOCTL_ret is set to a value indicating failure, such as -EPERM, the error code used in some operating systems to indicate that a process, such as the one requesting PCI passthrough 302 to the device, does not have the correct permission to execute the IOCTL operation.

At 906, it is checked if USB boot media is reserved by VM kernel USB storage driver. If the USB boot media is reserved by VM kernel USB storage driver, the method advances to 914 because the USB host controller device is not available and has been reserved. For example, if USB boot media is required by the host operating system, PCI passthrough 302 of USB host controller device 304 has to be prevented to any entity or VMs. For example, PCI passthrough 302 of a USB host controller device 304 conflicts with the requirement of stateful deployments of the vSphere hypervisor to maintain continuous access to the boot media that are commonly used for installation, scratch and coredump partitions. If the boot media is not reserved by VM kernel USB storage driver the method continues to operation 908.

At 908, the IOCTL_ret is set to -EBUSY, this value used in some operating systems indicates that an IOCTL operation failed because the device was in use by another driver. The previous setting of IOCTL_ret as -EPERM (no permission) is cleared and initialized to -EBUSY.

At 910, the host computing device 100 checks whether the global in-use count is equal to 0. When the USB global in-use counter is 0 it indicates that the USB host controller device and all USB devices attached to it are not claimed. Hence, the USB host controller device is available for a PCI passthrough 302. If global in-use counter is not 0, it indicates that either the USB host controller device and/or at least one of the USB devices attached to it has been claimed. Hence, the USB host controller device is not available for PCI passthrough and the method advances to operation 914.

If global in-use counter is 0, at 912 IOCTL_ret is cleared to 0 and global in-use counter is decremented to -1. When the USB global in-use counter is -1 it indicates that a PCI passthrough 302 has occurred to the USB host controller device. When IOCTL_ret is 0, it is a value indicating success of the IOCTL operation to initiate a PCI passthrough operation.

At 914 IOCTL_ret is returned and the method 900A ends. The IOCTL_ret value returned to the host computing device indicates the status of the PCI passthrough operation. IOCTL_ret is either 0 indicating success of PCI passthrough operation or -EBUSY indicating that the USB host controller device has been claimed or -EPERM indicating that the entity requesting does not have the permission to initiate a PCI passthrough operation to the USB host controller device.

Figure 9B:
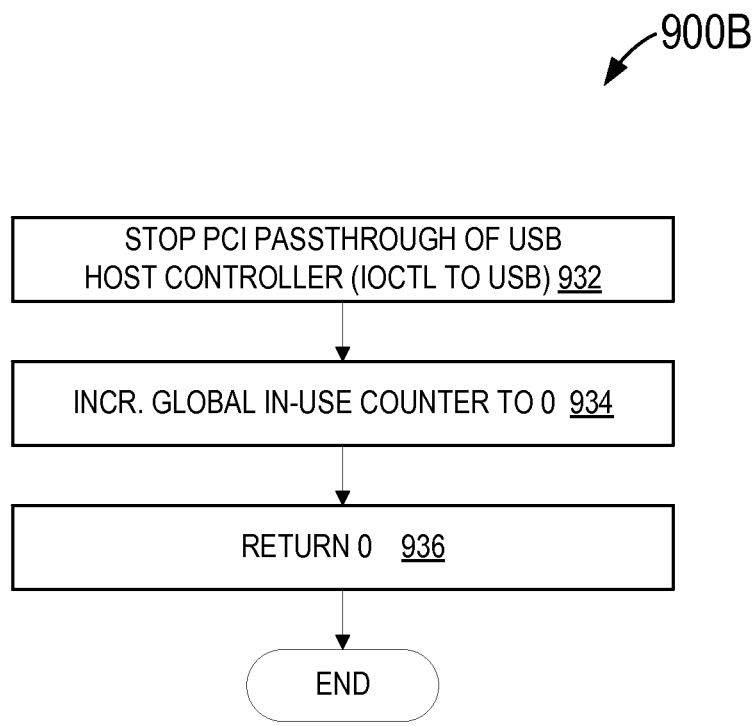
FIG. 9B is a flowchart of an exemplary method performed by the host computing device to stop PCI passthrough to a USB host controller device.

FIG. 9B is a flowchart of an exemplary method performed by the host computing device 100 to stop a PCI passthrough 302 to a USB host controller device. While method 900B is described with reference to execution by host computing device 100, it is contemplated that method 900B may be performed by any component of any computing device.

At 932, a request is initiated to stop PCI passthrough 302 of USB host controller device. During PCI passthrough, the USB host controller device and all devices under its hierarchy are unavailable to be claimed by any entity or VM. For example, the stopping of the PCI passthrough may be due to the VM or entity completing its operation or it may be in response to an "unclaim request" as in operation 614 initiated by another user mode USB driver.

At 934, global in-use counter is incremented to 0. While the PCI passthrough operation is active, the global in-use counter is -1. When the PCI passthrough of the USB host controller device is stopped, global in-use counter is incremented to 0. Global in-use counter of 0 indicates that the USB host controller device is now available to be claimed.

At 936, the method 900B ends and 0 is returned. Returning a value of 0 indicates that the call to method 900B was successful in stopping the PCI passthrough 302 of USB host controller device.

Additional Examples

The following scenarios are merely exemplary and not intended to be limiting in any way.

In another example, before a PCI passthrough 302 is initiated, the USB bus is interrogated to determine all USB devices 310 attached and attempts to claim all of the enumerated USB devices 310. One example calls USB passthrough to interrogate the bus and claim all the devices under the hierarchy of the USB host controller device 304. If all USB devices 310 are successfully claimed, the PCI passthrough functionality passes through the USB host controller 304 and all the USB devices 310 to the VM or entity. If the attempt to claim all the USB devices 310 is unsuccessful, all the claims are reverted and failure is returned. In such a case, the PCI passthrough is unsuccessful and −EBUSY is returned. For example, because of this failure, an appropriate message is displayed to the user.

In another example, while a USB passthrough operation is active "PCI-passthrough" flag is set. This disables any "read-safe IOCTL" operations to USB devices 310. For example, while PCI passthrough to the USB host controller device 304 is active, even read-safe IOCTL operations to USB devices 310 under its hierarchy are disabled. Examples of read-safe IOCTL operations include CONNECTINFO which returns a connection speed of the USB device 310.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device, such as host computing device 100, when programmed to execute the instructions described herein.

The examples illustrated and described herein as well as examples not specifically described herein but within the scope of aspects of the invention constitute exemplary means for receiving, from one entity of a plurality of entities with access to a computing device, a request for PCI passthrough of a USB host controller device on the computing device, exemplary means for determining, responsive to the received request, whether the USB host controller device is claimed by at least one of the plurality of entities with access to the computing device, and exemplary means for granting the request based on the determination.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

I claim:

1. A system for safely sharing universal serial bus (USB) host controller devices as peripheral component interconnect (PCI) devices, said system comprising:
   a memory area associated with a computing device, said memory area storing a global in-use counter corresponding to a quantity of devices attached to a USB host controller device that are claimed by at least one of a plurality of entities with access to the computing device; and
   a processor programmed to:
      interrogate a USB bus to calculate the global in-use counter; receive, from one entity of the plurality of entities, a request for peripheral component interconnect (PCI) passthrough of the USB host controller device on the computing device;
      responsive to the received request, determine whether the USB host controller device is claimed by at least one of the plurality of entities with access to the computing device; and
      grant the request based on the determination.

2. The system of claim 1, wherein the entity is executing on another computing device.

3. The system of claim 1, wherein the entity is selected from a group consisting of a guest operating system executing in a virtual machine (VM) on the computing device, a user space device driver, or a kernel space device driver.

4. The system of claim 1, wherein the processor is programmed to determine whether the USB host controller device is claimed by at least one of the plurality of entities by determining whether the global in-use counter is positive.

5. The system of claim 1, wherein the processor is further programmed to increment the global in-use counter when a kernel mode driver claims a USB device.

6. The system of claim 1, wherein the processor is further programmed to increment the global in-use counter when a user mode driver has a file handle open to a USB device.

7. The system of claim 1, wherein the processor is further programmed to decrement the global in-use counter when a user mode driver closes a file handle to a USB device.

8. The system of claim 1, wherein the processor is further programmed to decrement the global in-use counter when a kernel mode driver releases a USB device.

9. The system of claim 1, wherein the processor is programmed to interrogate the USB bus to calculate the global in-use counter in response to registration of a new USB driver.

10. A method comprising:
    interrogating a universal serial bus (USB) bus to calculate a global in-use counter, wherein the global in-use counter corresponds to a quantity of devices attached to a USB host controller device that are claimed by at least one of a plurality of entities with access to a computing device;
    receiving, from one entity of the plurality of entities with access to the computing device, a request for peripheral component interconnect (PCI) passthrough of the USB host controller device on the computing device;
    responsive to the received request, determining whether the USB host controller device is claimed by at least one of the plurality of entities with access to the computing device; and
    granting the request based on the determination.

11. The method of claim 10, wherein granting the request comprises preventing the entity from claiming the USB host controller device on determining that the USB host controller device is claimed by at least one of the plurality of entities.

12. The method of claim 10, wherein granting the request comprises allowing the entity to claim the USB host controller device on determining that the USB host controller device is not claimed by any of the plurality of entities.

13. The method of claim 10, wherein determining whether the USB host controller device is claimed by at least one of the plurality of entities comprises determining whether the USB host controller device is required for access to a device that is claimed by at least one of the plurality of entities.

14. The method of claim 10, wherein determining whether the USB host controller device is claimed by at least one of the plurality of entities comprises determining whether any device attached to the USB host controller device is claimed by at least one of the plurality of entities.

15. One or more computer-readable storage media including computer-executable instructions that, when executed, cause at least one processor to safely share universal serial bus (USB) host controller devices as peripheral component interconnect (PCI) devices by:
    receiving, from one entity of a plurality of entities with access to a computing device, a request for PCI pass through of a USB host controller device on the computing device;
    responsive to the received request, determining whether the USB host controller device is claimed by at least one of the plurality of entities with access to the computing device; and
    granting the request based on the determination, wherein granting the request comprising:
       preventing any user mode USB host controller driver from performing input/output (I/O) control (IOCTL) operations on the USB host controller device on determining that the USB host controller device will be claimed by a kernel mode USB host controller driver, and
       preventing any kernel mode USB host controller driver from claiming the USB host controller device for I/O access on determining that the USB host controller device is available to be claimed by one or more user mode USB host controller drivers.

16. The computer-readable storage media of claim 15, wherein the computer-executable instructions further cause the at least one processor to provide the entity with access to the USB host controller device via PCT passthrough.

17. The computer-readable storage media of claim 15, wherein the computer-executable instructions cause the at least one processor to determine whether the USB host controller device is claimed by maintaining a global in-use counter corresponding to a quantity of devices attached to the USB host controller device that are claimed by at least one of the plurality of entities.

18. The computer-readable storage media of claim 17, wherein the computer-executable instructions cause the at least one processor to maintain the global in-use counter by updating the global in-use counter while walking a USB bus to determine which USB hubs are roots of subtrees for USB devices.

19. The computer-readable storage media of claim 15, wherein the computer-executable instructions cause the at least one processor to claim, in response to granting the request, the USB host controller device and all USB devices connected thereto for the entity.

20. The computer-readable storage media of claim 19, wherein the computer-executable instructions further cause the processor to boot the computing device via USB before receiving the request for PCI passthrough.

\* \* \* \* \*